(12) United States Patent
Song et al.

(10) Patent No.: US 9,077,410 B2
(45) Date of Patent: Jul. 7, 2015

(54) APPARATUS AND METHOD OF TRANSMITTING DATA IN MULTI-CARRIER SYSTEM

(71) Applicant: Electronics and Telecommunications Research Institute, Daejeon (KR)

(72) Inventors: Yun Jeong Song, Daejeon (KR); Hun Hee Lee, Daejeon (KR); Young Su Kim, Daejeon (KR); Joungil Yun, Daejeon (KR); Byungjun Bae, Daejeon (KR); HyoungSoo Lim, Daejeon (KR); Namho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/302,532

(22) Filed: Jun. 12, 2014

(65) Prior Publication Data

US 2015/0139356 A1    May 21, 2015

(30) Foreign Application Priority Data

Nov. 20, 2013    (KR) .................. 10-2013-0141670

(51) Int. Cl.
| | |
|---|---|
| H04K 1/02 | (2006.01) |
| H04L 25/03 | (2006.01) |
| H04L 25/49 | (2006.01) |
| H04B 1/04 | (2006.01) |
| H04L 27/26 | (2006.01) |

(52) U.S. Cl.
CPC ............ *H04B 1/0475* (2013.01); *H04L 27/264* (2013.01); *H04L 27/2627* (2013.01)

(58) Field of Classification Search
CPC ................... H04B 1/0475; H04B 2001/0491; H04L 27/368; H04L 25/03343; H04L 27/2647; H04L 27/2657; H04L 5/0007; H04L 27/2627; H04L 27/264
USPC ................. 375/296, 260, 285, 284; 455/63.1, 455/114.3, 296
See application file for complete search history.

(56) References Cited

U.S. PATENT DOCUMENTS

| | | | | |
|---|---|---|---|---|
| 2002/0080884 | A1* | 6/2002 | Lee et al. ................. | 375/261 |
| 2002/0101936 | A1* | 8/2002 | Wright et al. ............. | 375/296 |
| 2003/0063683 | A1* | 4/2003 | MacFarlane Shearer et al. .......................... | 375/295 |
| 2010/0104042 | A1* | 4/2010 | Benjebbour et al. ...... | 375/285 |
| 2010/0172395 | A1* | 7/2010 | Sambhwani et al. ...... | 375/146 |
| 2011/0135035 | A1* | 6/2011 | Bose et al. ................ | 375/300 |
| 2011/0249769 | A1 | 10/2011 | Kang et al. | |
| 2013/0070811 | A1* | 3/2013 | Kim et al. ................. | 375/136 |

* cited by examiner

*Primary Examiner* — Phuong Phu
(74) *Attorney, Agent, or Firm* — William Park & Associates Ltd.

(57) ABSTRACT

An apparatus of transmitting data in a multi-carrier system includes: a plurality of pulse-shaping filters for performing pulse shaping of incoming data symbols during a set pulse-shaping period; and a plurality of frequency converters convert signals that are pulse-shaped by the plurality of pulse-shaping filters into signals with frequency bands for a plurality of subcarriers.

11 Claims, 9 Drawing Sheets

APPARATUS AND METHOD OF TRANSMITTING DATA IN MULTI-CARRIER SYSTEM

CROSS-REFERENCE TO RELATED APPLICATION

This application claims priority to and the benefit of Korean Patent Application No. 10-2013-0141670 filed in the Korean Intellectual Property Office on Nov. 20, 2013, the entire contents of which are incorporated herein by reference.

BACKGROUND OF THE INVENTION (a) Field of the Invention

The present invention relates to an apparatus and method of transmitting data in a multi-carrier system, and more particularly, to an apparatus and method of transmitting data in a filter bank multi-carrier (FBMC) scheme.

(b) Description of the Related Art

An FBMC transmission scheme uses a plurality of subcarrier pulse-shaping filters. Each of the subcarrier pulse-shaping filters satisfies the Nyquist's condition and has the same symbol transmission period. In the FBMC transmission scheme, the pulse formation method and the pulse speed are set in a way that has the maximum transfer rate in a given bandwidth.

Since this FBMC transmission scheme allows for data transmission without causing inter-symbol interference, data can be decoded without distortion at a receiving end. However, if there is a lot of additional data of little importance in transmission, a transmission delay may occur because the pulse-shaping speed is set. Accordingly, the FBMC transmission scheme also requires a technique for adjusting data traffic according to the situation.

SUMMARY OF THE INVENTION

The present invention has been made in an effort to provide an apparatus and method for transmitting data in a multi-carrier system, which are capable of adjusting data traffic in an FBMC scheme.

An exemplary embodiment of the present invention provides an apparatus for transmitting data in a multi-carrier system. The data transmitting apparatus includes a plurality of pulse-shaping filters and a plurality of frequency converters. The plurality of pulse-shaping filters perform pulse shaping of incoming data symbols according to a set pulse-shaping period. The plurality of frequency converters convert signals that are pulse-shaped by the plurality of pulse-shaping filters into signals with frequency bands for a plurality of subcarriers. The plurality of pulse-shaping filters each have different pulse-shaping periods.

The pulse-shaping period is a value obtained by multiplying a symbol transmission period which allows for transmission without inter-symbol interference by an FTN (Faster than Nyquist) transmission parameter, the FTN transmission parameter has a value between 0 and 1, and the plurality of pulse-shaping filters each have a different FTN transmission parameter.

The data transmitting apparatus may further include a filter selector. The filter selector selects a pulse-shaping filter for performing pulse shaping of the incoming data symbols according to a set criterion.

The criterion may include priority or importance of the data symbols.

The filter selector may select a pulse-shaping filter having a larger FTN transmission parameter value for data of higher priority.

The filter selector may select a pulse-shaping filter having a larger FTN transmission parameter value for data of higher importance.

Another embodiment of the present invention provides a method of transmitting data by a data transmitting apparatus in a multi-carrier system. The data transmitting method includes: performing pulse shaping of a plurality of data symbols by a plurality of pulse-shaping filters each having a different pulse-shaping period; converting signals that are pulsed-shaped by the plurality of pulse-shaping filters into signals with frequency bands for a plurality of subcarriers; and coupling the signals with the frequency bands for the plurality of subcarriers and transmitting the same.

The pulse-shaping period is a value obtained by multiplying a symbol transmission period which allows for transmission without inter-symbol interference by an FTN (Faster than Nyquist) transmission parameter, and the FTN transmission parameter has a value between 0 and 1.

The pulse shaping may include selecting a pulse-shaping filter for performing pulse shaping of the plurality of data symbols according to priority or importance of the plurality of data symbols.

The selecting may include selecting a pulse-shaping filter having a longer pulse-shaping period for data of higher priority.

The selecting may include selecting a pulse-shaping filter having a longer pulse-shaping period for data of higher importance.

DETAILED DESCRIPTION OF THE EMBODIMENTS

Figure 1:
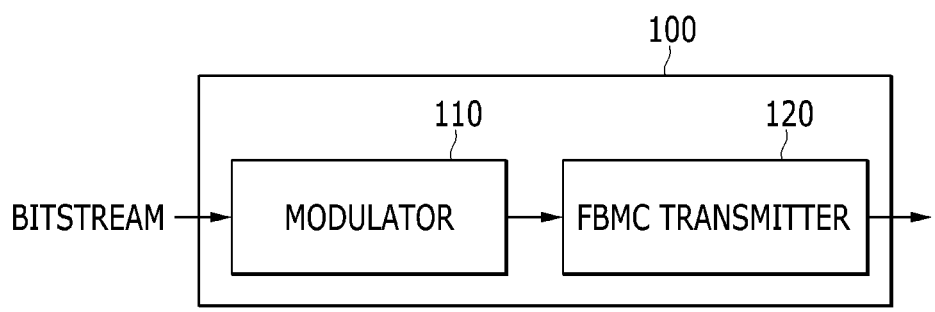
FIG. 1 is a view schematically showing an apparatus of transmitting data in a multi-carrier system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Parts irrelevant to the description are omitted to clearly describe the present invention, and like reference numerals denote like elements throughout the drawings.

In the specification, when a certain part "includes" a certain component, this indicates that the part may further include another component instead of excluding another component unless there is a different disclosure.

Now, an apparatus and method of transmitting data in a multi-carrier system according to an exemplary embodiment of the present invention will be described in detail with reference to the drawings.

Figure 2:
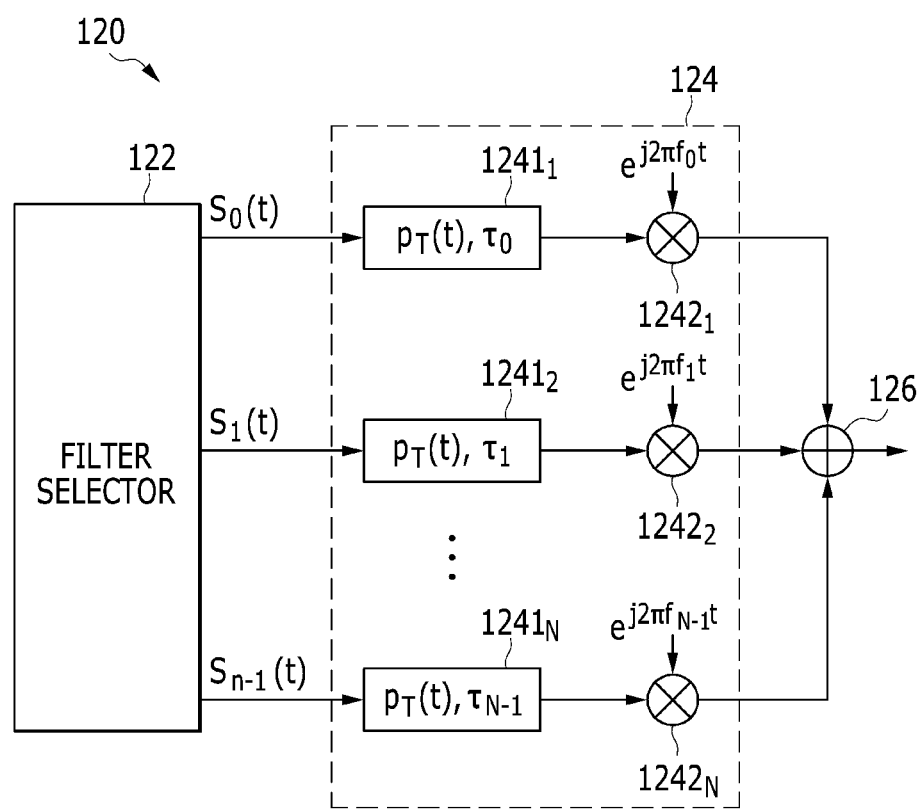
FIG. 2 is a view showing an FBMC transmitter of FIG. 1.
Figure 3:
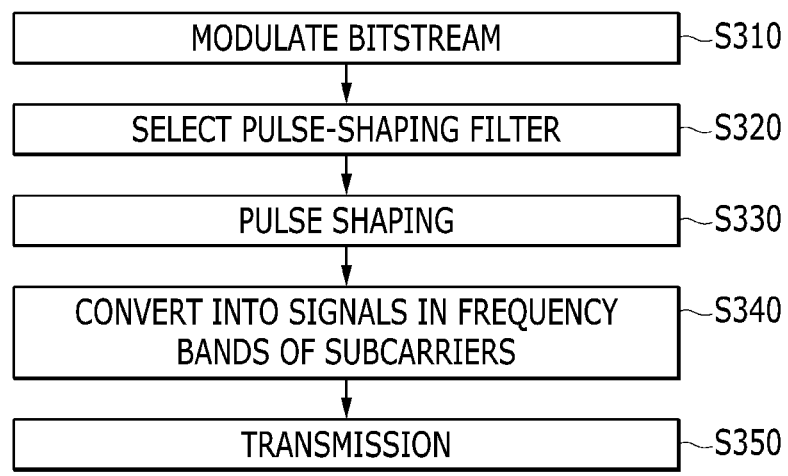
FIG. 3 is a flowchart showing a method of transmitting data in a multi-carrier system according to an exemplary embodiment of the present invention.

FIG. 1 is a view showing schematically showing an apparatus of transmitting data in a multi-carrier system according to an exemplary embodiment of the present invention, and FIG. 2 is a view showing an FBMC transmitter of FIG. 1. FIG. 3 is a flowchart showing a method of transmitting data in a multi-carrier system according to an exemplary embodiment of the present invention.

Referring to FIG. 1, a data transmitting apparatus 100 in a multi-carrier system includes a modulator 110 and an FBMC (filter bank multi-carrier) transmitter 120.

Referring to FIG. 3, the modulator 110 modulates an incoming bitstream (S310). The modulator 110 can modulate a bitstream input by a transmission scheme such as BPSK (binary phase shift keying), QPSK (quadrature phase shift keying), or QAM (quadrature amplitude modulation) into data symbols.

Referring to FIG. 2, the FBMC transmitter 120 includes a filter selector 122, a transmission filter bank 124, and a coupler 126.

Referring to FIG. 2 and FIG. 3, the filter selector 122 selects a pulse-shaping filter to be applied to data symbols input from the modulator 110 (S320), and transmits the data symbols to the one selected from among the plurality of pulse-shaping filters $1241_1$ to $1241_N$. For example, if priority is set on an incoming bitstream, the filter selector 122 can select the pulse-shaping filter to be applied to the data symbols according to priority. Also, the filter selector 122 can select the pulse-shaping filter to be applied to the data symbols according to the importance of the incoming bitstream.

The transmission filter bank 124 performs pulse shaping of incoming data symbols and transmits them by a plurality of multi-carriers. The transmission filter bank 124 includes the plurality of pulse-shaping filters $1241_1$ to $1241_N$ and a plurality of frequency converters $1242_1$ to $1242_N$.

The number of pulse-shaping filters $1241_1$ to $1241_N$ corresponds to the number of multi-carriers used. The pulse-shaping filters $1241_1$ to $1241_N$ have an impulse response $P_T(t)$, and perform pulse shaping of data symbols at a symbol response speed set according to the impulse response $P_T(t)$ and outputs them to the corresponding frequency converters $1242_1$ to $1242_N$ (S330).

The pulse-shaping filters $1241_1$ to $1241_N$ according to the exemplary embodiment of the present invention each have a different pulse-shaping period ($=\tau*Ts$). Ts is the symbol transmission period which allows for transmission without causing inter-symbol interference, and $\tau$ is an FTN (faster than Nyquist) transmission parameter which has a value between 0 and 1 ($0 \leq \tau \leq 1$).

That is, the pulse-shaping filters $1241_1$ to $1241_N$ according to the exemplary embodiment of the present invention have different $\tau$ values, and at least one of the pulse-shaping filters $1241_1$ to $1241_N$ has a pulse-shaping period which satisfies the $\tau$ value of 1, that is, the Nyquist's condition, and the other pulse-shaping filters have a $\tau$ value of less than 1. Signal transmission through a pulse-shaping filter having a $\tau$ value of less than 1 is referred to as FTN transmission.

Signals transmitted through a pulse-shaping filter having a large $\tau$ value are less affected by channels. Instead, the amount of data transmitted through a pulse-shaping filter having a large $\tau$ value becomes relatively smaller. On the other hand, the pulse-shaping period becomes shorter as the $\tau$ value becomes smaller. Hence, the amount of data transmitted through a pulse-shaping filter having a small $\tau$ value becomes relatively larger. However, the smaller the $\tau$ value, the greater the inter-symbol interference (ISI) of a transmission signal. This increases signal deterioration.

Accordingly, the filter selector 122 selects a pulse-shaping filter having a larger $\tau$ value for data of higher priority or importance. For example, data of very high priority or importance, which should be necessarily transmitted, can be transmitted through a pulse-shaping filter having the $\tau$ value of 1. Also, data of lower priority or importance can be transmitted through a pulse-shaping filter having a smaller $\tau$ value.

Next, the pulse-shaping filters $1241_1$ to $1241_N$ convert pulse-shaped signals into signals with frequency bands occupied by a plurality of subcarriers and output them (S340).

The coupler 126 couples the signals with the frequency bands of the plurality of subcarriers and outputs them through an antenna (S350).

Figure 4:
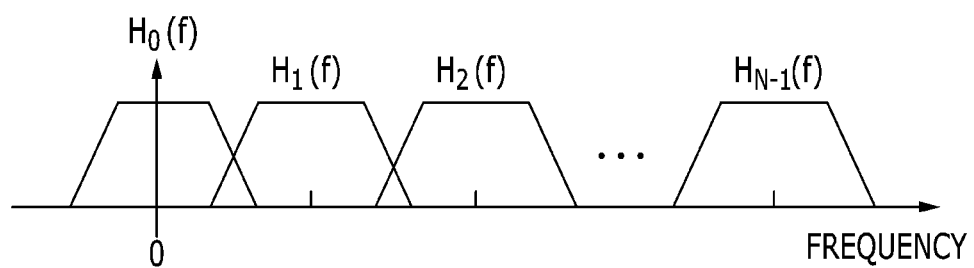
FIG. 4 is a view showing an example of frequency bands for different subcarriers used in the exemplary embodiment of the present invention.

FIG. 4 is a view showing an example of frequency bands for different subcarriers used in the exemplary embodiment of the present invention.

As shown in FIG. 4, N subcarriers each have different frequency bandwidths $[H_0(f), H_1(f), \ldots, H_{N-1}(f)]$. $H_0(f), H_1(f), \ldots, H_{N-1}(f)$ denote the frequency bandwidth of the N subcarriers at frequencies $f_0, f_1, \ldots, f_{N-1}$.

The plurality of frequency converters $1242_1$ to $1242_N$ can convert pulse-shaped signals into signals with the frequency bands $[H_0(f), H_1(f), \ldots, H_{N-1}(f)]$ of the subcarriers by multiplying the pulse-shaped signals by subcarrier signals $e^{j2\pi f_0 t}$, $e^{j2\pi f_1 t}, \ldots, e^{j2\pi f_{N-1} t}$.

Figure 5:
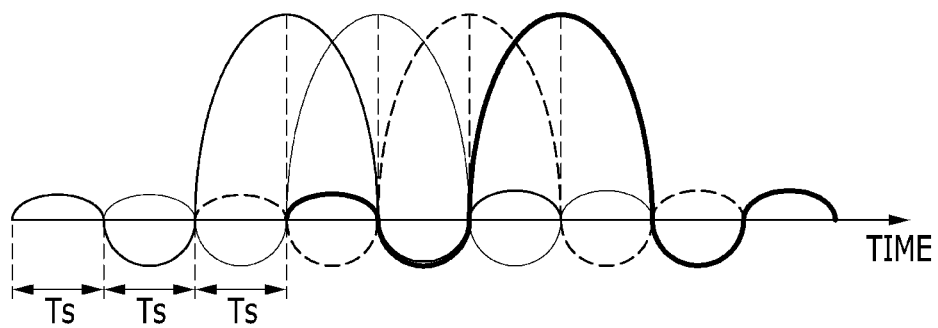
FIG. 5 and FIG. 6 are views showing an example of waveforms output from a pulse-shaping filter according to an exemplary embodiment of the present invention.
Figure 6:
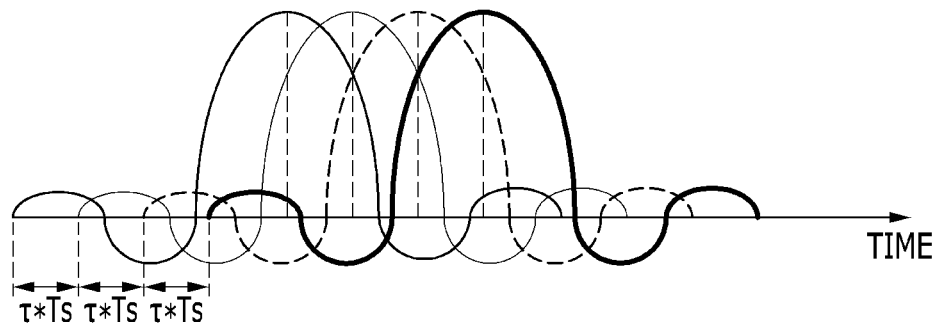
Figure 7:
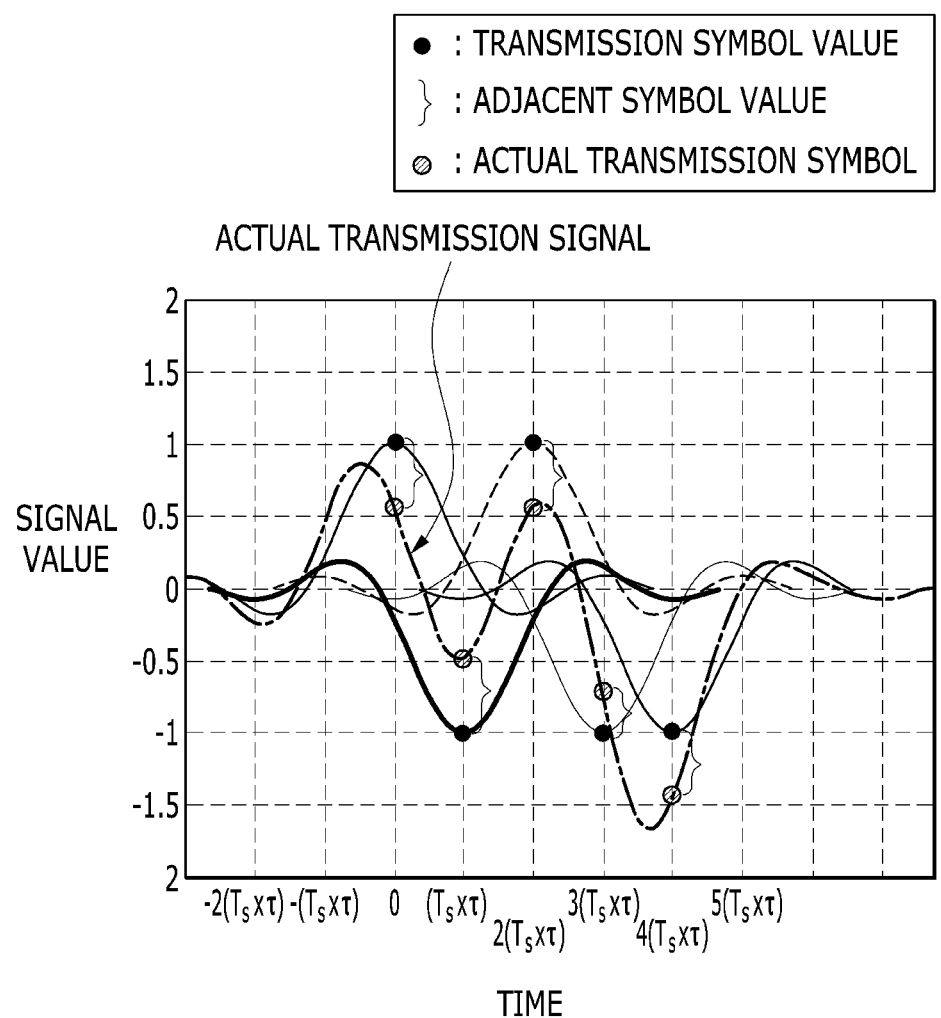
FIG. 7 is a view showing an example of a transmission signal using a pulse-shaping filter having a $\tau$ value of less than 1.

FIG. 5 and FIG. 6 are views showing an example of waveforms output from a pulse-shaping filter according to an exemplary embodiment of the present invention. FIG. 7 is a view showing an example of a transmission signal using a pulse-shaping filter having a $\tau$ value of less than 1.

FIG. 5 depicts waveforms output from a pulse-shaping filter having the $\tau$ value of 1. From the waveforms output from the pulse-shaping filter having the $\tau$ value of 1, it is found out that there is no inter-symbol interference at all.

FIG. 6 depicts waveforms output from a pulse-shaping filter having a $\tau$ value of less than 1. As shown in FIG. 6, it is found out that, although the pulse-shaping filter having a $\tau$ value less than 1 can increase the symbol transmission rate compared to FIG. 5, a transmission signal inevitably has inter-symbol interference (ISI).

Particularly, as shown in FIG. 7, assuming that the transmission signal is [1, −1, 1, −1, −1], the actual transmission signal that has passed through the pulse-shaping filter having a $\tau$ value of less than 1 does not have the value of [1, −1, 1, −1, −1], but instead becomes a signal obtained by adding the transmission signal and inter-symbol interference.

Accordingly, the filter selector 122 selects a pulse-shaping filter having a larger $\tau$ value for data of higher priority or importance, thereby allowing a receiver to receive data without distortion caused by inter-symbol interference.

In this way, the data transmitting apparatus 100 is able to provide different transmission capacity and performance efficiency to different subcarriers by setting different $\tau$ values for pulse-shaping filters on different subcarriers.

Moreover, the data receiving apparatus is able to differentially receive data transmitted on different subcarriers depending on the channel environment and to receive data of high priority or importance without distortion even under a poor channel environment. Further, the data receiving apparatus is able to receive even data of low priority or importance transmitted at high transfer rates if the channel status is good.

Figure 8:
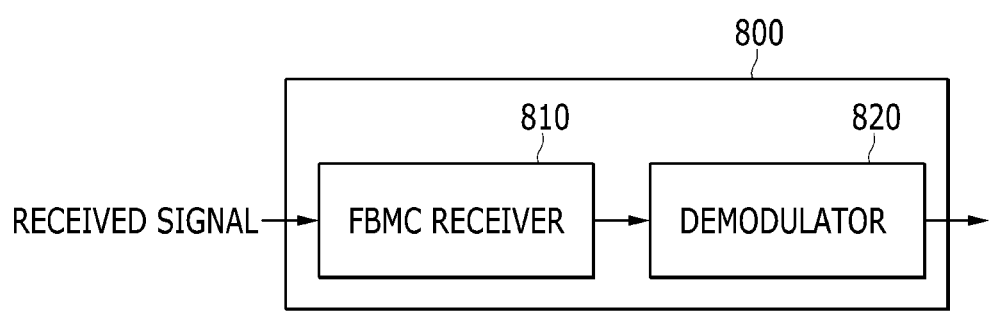
FIG. 8 is a view schematically showing a data receiving apparatus in a multi-carrier system according to an exemplary embodiment of the present invention.
Figure 9:
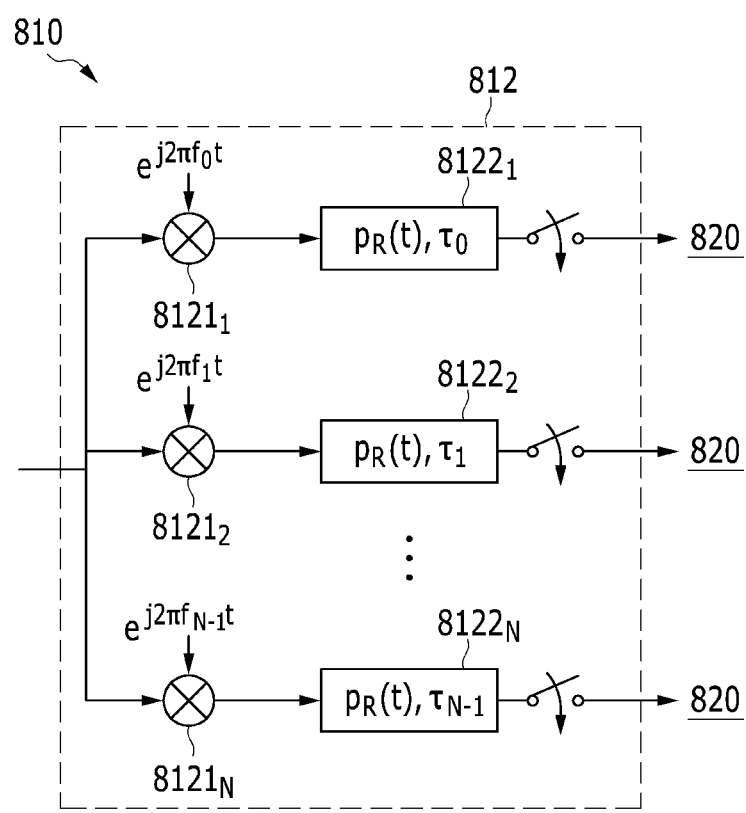
FIG. 9 is a view showing a reception filter bank of FIG. 8.

FIG. 8 is a view schematically showing a data receiving apparatus in a multi-carrier system according to an exemplary embodiment of the present invention, and FIG. 9 is a view showing a reception filter bank of FIG. 8.

Referring to FIG. 8, a data receiving apparatus 800 in a multi-carrier system includes an FBMC receiver 810 and a demodulator 820.

The FBMC receiver 810 includes a reception filter bank 812.

Referring to FIG. 9, the reception filter bank 812 includes frequency converters 8121$_1$ to 8121$_N$ and pulse-shaping filters 8122$_1$ to 8122$_N$.

The frequency converters 8121$_1$ to 8121$_N$ convert a signal received through channels into baseband signals. The frequency converters 8121$_1$ to 8121$_N$ are able to convert signals received through channels into baseband signals by multiplying the signals by the corresponding subcarrier signals $e^{j2\pi f_0 t}$, $e^{j2\pi f_1 t}, \ldots, e^{j2\pi f_{N-1} t}$.

The pulse-shaping filters 8122$_1$ to 8122$_N$ are matched filters of the pulse-shaping filters 1241$_1$-1241$_N$ of the data receiving apparatus 100, and have an impulse response $P_R(t)$ and the same $\tau$ value as the pulse-shaping filters 1241$_1$ to 1241$_N$.

The baseband signals output from the frequency converters 8121$_1$ to 8121$_N$ are pulse-shaped according to the impulse response $P_R(t)$ at time $t=k*\tau*Ts$ (k is a positive integer) to output data symbols on the corresponding subcarriers.

The pulse-shaping filters 8122$_1$ to 8122$_N$ perform pulse shaping the baseband signals during a pulse-shaping period, and output data symbols on the corresponding subcarriers.

The data symbols on the corresponding subcarriers are transmitted to the demodulator 820 after performing channel compensation on the data symbols and removing inter-symbol from the data symbols. The channel compensation and the inter-symbol interference caused by $\tau$ can be performed by an equalizer (not shown).

Referring again to FIG. 8, the demodulator 820 demodulates the data symbols output from the pulse-shaping filters 8122$_1$ to 8122$_N$ to detect the transmitted bits.

According to an embodiment of the present invention, it is possible to provide a different data transmission capacity for each subcarrier and adjust the overall data traffic by setting a different pulse-shaping period for each pulse-shaping filter by an FBMC scheme.

Furthermore, various kinds of data can be received depending on the channel environment, even if the channel environment changes with time, as in a mobile broadcasting environment, and basic data can be received even under a poor channel environment.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for transmitting data in a multi-carrier system, the apparatus comprising:
    a plurality of pulse-shaping filters for performing pulse shaping of incoming data symbols according to a set pulse-shaping period; and
    a plurality of frequency converters for converting signals that are pulse-shaped by the plurality of pulse-shaping filters into signals with frequency bands for a plurality of subcarriers,
    wherein the plurality of pulse-shaping filters each have different pulse-shaping periods.

2. The apparatus of claim 1, wherein the pulse-shaping period is a value obtained by multiplying a symbol transmission period which allows for transmission without inter-symbol interference by an FTN (Faster than Nyquist) transmission parameter, the FTN transmission parameter has a value between 0 and 1, and the plurality of pulse-shaping filters each have a different FTN transmission parameter.

3. The apparatus of claim 2, further comprising a filter selector that selects a pulse-shaping filter for performing pulse shaping of the incoming data symbols according to a set criterion.

4. The apparatus of claim 3, wherein the criterion comprises priority or importance of the data symbols.

5. The apparatus of claim 3, wherein the filter selector selects a pulse-shaping filter having a larger FTN transmission parameter value for data of higher priority.

6. The apparatus of claim 3, wherein the filter selector selects a pulse-shaping filter having a larger FTN transmission parameter value for data of higher importance.

7. A method of transmitting data by a data transmitting apparatus in a multi-carrier system, the method comprising:
    performing pulse shaping of a plurality of data symbols by a plurality of pulse-shaping filters each having a different pulse-shaping period;
    converting signals that are pulsed-shaped by the plurality of pulse-shaping filters into signals with frequency bands for a plurality of subcarriers; and
    coupling the signals with the frequency bands for the plurality of subcarriers and transmitting the same.

8. The method of claim 7, wherein the pulse-shaping period is a value obtained by multiplying a symbol transmission period which allows for transmission without inter-symbol interference by an FTN (Faster than Nyquist) transmission parameter, and the FTN transmission parameter has a value between 0 and 1.

9. The method of claim 7, wherein the pulse shaping comprises selecting a pulse-shaping filter for performing pulse shaping of the plurality of data symbols according to priority or importance of the plurality of data symbols.

10. The method of claim 9, wherein the selecting comprises selecting a pulse-shaping filter having a longer pulse-shaping period for data of higher priority.

11. The method of claim 9, wherein the selecting comprises selecting a pulse-shaping filter having a longer pulse-shaping period for data of higher importance.

* * * * *